(12) United States Patent
Tojo et al.

(10) Patent No.: US 7,123,264 B2
(45) Date of Patent: Oct. 17, 2006

(54) MOVING IMAGE MANAGEMENT APPARATUS AND METHOD

(75) Inventors: Hiroshi Tojo, Tokyo (JP); Hidetomo Sohma, Kanagawa (JP); Tadashi Nakamura, Nara (JP); Masafumi Shimotashiro, Osaka (JP); Masanori Ito, Osaka (JP)

(73) Assignees: Canon Kabushiki Kaisha, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 119 days.

(21) Appl. No.: 10/694,575

(22) Filed: Oct. 28, 2003

(65) Prior Publication Data

US 2004/0189692 A1  Sep. 30, 2004

Related U.S. Application Data

(63) Continuation of application No. PCT/JP02/05228, filed on May 29, 2002.

(30) Foreign Application Priority Data

May 31, 2001  (JP) .............................. 2001-165382

(51) Int. Cl.
*G06T 15/00* (2006.01)

(52) U.S. Cl. ....................... 345/474; 345/475; 358/448

(58) Field of Classification Search ................ 345/473, 345/474, 475; 358/448, 453

See application file for complete search history.

(56) References Cited

U.S. PATENT DOCUMENTS

| 5,440,401 | A | 8/1995 | Parulski et al. ............. 358/342 |
| 6,336,155 | B1 | 1/2002 | Ito et al. ........................ 710/37 |
| 6,377,309 | B1 | 4/2002 | Ito et al. ...................... 348/554 |
| 6,549,660 | B1 * | 4/2003 | Lipson et al. ................ 382/224 |
| 6,677,967 | B1 * | 1/2004 | Sawano et al. ............. 715/839 |
| 6,734,876 | B1 * | 5/2004 | Niikawa et al. ............. 345/698 |
| 6,879,348 | B1 * | 4/2005 | Niida ........................... 348/552 |
| 2002/0047936 | A1 | 4/2002 | Tojo ............................ 348/700 |
| 2002/0122212 | A1 | 9/2002 | Tojo ............................ 358/453 |
| 2003/0043276 | A1 | 3/2003 | Tojo ....................... 348/207.99 |

FOREIGN PATENT DOCUMENTS

| EP | 0 915 469 A2 | 5/1999 |
| EP | 0 945 864 A2 | 9/1999 |
| EP | 1 033 718 A2 | 9/2000 |
| EP | 1 052 644 A1 | 11/2000 |

(Continued)

OTHER PUBLICATIONS

PCT International Search Report dated Aug. 28, 2002.

(Continued)

*Primary Examiner*—Phu K. Nguyen
(74) *Attorney, Agent, or Firm*—Fitzpatrick, Cella, Harper & Scinto

(57) ABSTRACT

A moving image data management apparatus which manages moving image data and representative image data by using one or plural representative image data in correspondence with each moving image data. A thumbnail representing an arbitrary section in a moving image represented by moving image data is generated, and stored in a thumbnail area of the moving image file. Indexes corresponding to the respective thumbnails are stored in an index area of the moving image file. Each index includes start point/end point indicating a section in moving image data represented by the thumbnail image and attribute information indicating usage of the thumbnail. By this attribute information, operability of moving image data using representative images can be improved upon execution of various moving image data processing, and management of the representative images can be simplified.

50 Claims, 13 Drawing Sheets

FOREIGN PATENT DOCUMENTS

| | | |
|---|---|---|
| JP | 3-81304 | 4/1991 |
| JP | 11-176137 | 7/1999 |
| JP | 2000-322875 | 11/2000 |
| KR | 1999-86037 | 12/1999 |
| KR | 2000-2690 | 1/2000 |
| WO | WO 03/003371 A1 | 1/2003 |

OTHER PUBLICATIONS

PCT Internati nal Preliminary Examinati n Report (IPER) dated Jul. 15, 2003.

* cited by examiner

FIG. 5

| Length (Bytes) | Contents |
| --- | --- |
| 6 | Start Point |
| 6 | End Point |
| 2 | Thumbnail Type ID |
| 4 | Thumbnail Offset |

| Length (Bytes) | Contents |
|---|---|
| 2 | Thumbnail Imege Size |
| 6 | Thumbnail Key Relative Point |
| 4 | Thumbnail Image Offset |

MOVING IMAGE MANAGEMENT APPARATUS AND METHOD

This is a Continuation Application of PCT/JP02/05228 filed May 29, 2002.

TECHNICAL FIELD

The present invention relates to moving image data management apparatus and method for management of moving image data recorded on a storage medium by one or plural representative images.

BACKGROUND ART

Conventionally, a method of managing moving images recorded on a storage medium by using representative images has been proposed. Japanese Patent No. 03081304 discloses utilizing representative images in general reproduction apparatus for moving and still images, and especially discloses using representative images for simplified display upon selection of still or moving image. Further, Japanese Published Unexamined Patent Application Nos. Hei 11-176137 and 2000-322875 disclose assigning a representative image to a moving image section, and selecting a section as a target of reproduction designation by using the representative image.

As such representative image is generally used, variety of usage of representative image increases. For example, image management using the representative images can be applied to an editing apparatus as well as the above-described reproduction apparatus.

However, even regarding the same moving image, a representative image appropriate to a user interface upon reproduction and a representative image appropriate to a user interface upon editing are different from each other. Accordingly, if the same representative image is to be used in various apparatuses including an editing apparatus, the following problem occurs.

For example, in FIG. 1, reference numeral 11 denotes a moving image. In this moving image, the motion of a batter who holds a bat at the ready and hits a ball is recorded in a section (a). Numerals 12 and 13 denote representative images regarding the same section (a). The representative image 12, formed from a head frame of the section (a), is an image of the batter at the ready. The representative image 13, which is an image of the batter when he hits the ball, is a most appropriate representative image to indicate the content of the section (a).

Generally, as one representative image is assigned to one section, one of the representative images 12 and 13 is actually registered as a representative image of the section (a). The registered representative image can be used as an index image for e.g. a reproduction apparatus. However, if the representative image 13 is registered, upon selection of representative image in the reproduction apparatus, reproduction starts from a status prior to the hit, thus a user feels unnatural. On the other hand, if the representative image 12 is registered, when the image is used in an editing apparatus, the content of the section (a) cannot be precisely grasped by the image 12. That is, in the example of FIG. 1, it cannot be determined from the representative image 12 whether the section (a) indicates a scene where the batter hits the ball or a scene where the batter swings at the ball and miss. In this manner, an appropriate representative image in one section of moving image depends on the purpose of apparatus to be used.

Conventionally, assignment and management of representative images are necessary in accordance with purpose and usage of moving image data such as reproduction and editing. Accordingly, information on the representative images are redundantly held by moving image or still image, or by apparatus or usage. Further, program code for processing to utilize the information is respectively held for the representative images. That is, when the representative images are utilized in various moving image data processing, the information on the representative images are respectively managed by apparatus or program. Accordingly, it is wasteful to independently store the representative image data. To attain excellent operability upon use of appropriate representative image, management of representative images becomes complicated.

DISCLOSURE OF THE INVENTION

The present invention has been made in consideration of the above problem, and has its object to improve operability of moving image data using representative images upon execution of various moving image data processing and to simplify management of the representative images.

According to the present invention, the foregoing object is attained by providing a moving image management apparatus for management of plural moving images recorded on a storage medium in correspondence with one or plural representative images, comprising: means for recording a representative image representing an arbitrary section or the whole of a moving image; means for recording information indicating the section or the whole of the moving image represented by said representative image in correspondence with said representative image; and means for recording information indicating a position of an image as a base of said representative image in correspondence with said representative image, wherein in case of said representative image is designated by a user, it is interpreted that the section or the whole of the moving image represented by the representative image is selected.

According to another aspect of the present invention, the foregoing object is attained by providing a moving image management apparatus for management of plural moving images recorded on a storage medium in correspondence with one or plural representative images, comprising: generation means for generating a representative image representing an arbitrary section or the whole of a moving image; first recording means for recording information indicating the section or the whole of the moving image represented by said representative image in correspondence with said representative image; and second recording means for recording information indicating a position of an image as a base of said representative image in correspondence with said representative image.

Still another aspect of the present invention, the foregoing object is attained by providing a moving image management method for management of plural moving images recorded on a storage medium in correspondence with one or plural representative images, comprising: a step of recording a representative image representing an arbitrary section or the whole of a moving image; a step of recording information indicating the section or the whole of the moving image represented by said representative image in correspondence with said representative image; and a step of recording information indicating a position of an image as a base of said representative image in correspondence with said representative image, wherein in case of said representative image is designated by a user, it is interpreted that the section or the whole of the moving image represented by the representative image is selected.

Still another aspect of the present invention, the foregoing object is attained by providing a moving image management method for management of plural moving images recorded on a storage medium in correspondence with one or plural representative images, comprising: a generation step of generating a representative image representing an arbitrary section or the whole of a moving image; a first recording step of recording information indicating the section or the whole of the moving image represented by said representative image in correspondence with said representative image; and a second recording step of recording information indicating a position of an image as a base of said representative image in correspondence with said representative image.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing an example of data structure for 1 index in an index area 406 in a footer 403 in FIG. 4;

BEST MODE FOR CARRYING OUT THE INVENTION

A preferred embodiment of the present invention will now be described in detail in accordance with the accompanying drawings.

In the present embodiment, in a method for utilizing representative images, to manage/utilize information related to representative images in a simple manner, the information is prepared for shared access, and redundant information for distinction or shared access is added to the information related to representative images in correspondence with usage or the like. In this arrangement, information on the representative images or the like can be recorded and stored in a simple manner, thus waste is avoided. Further, according to the present embodiment, as information necessary for realizing unique functions of respective apparatuses and programs is included in the information on representative images or the like, the functions can be realized. Further, upon storage of the information related to representative image, the arrangement, format or the like of the storage is changed in accordance with usage or format of the information.

Figure 1:
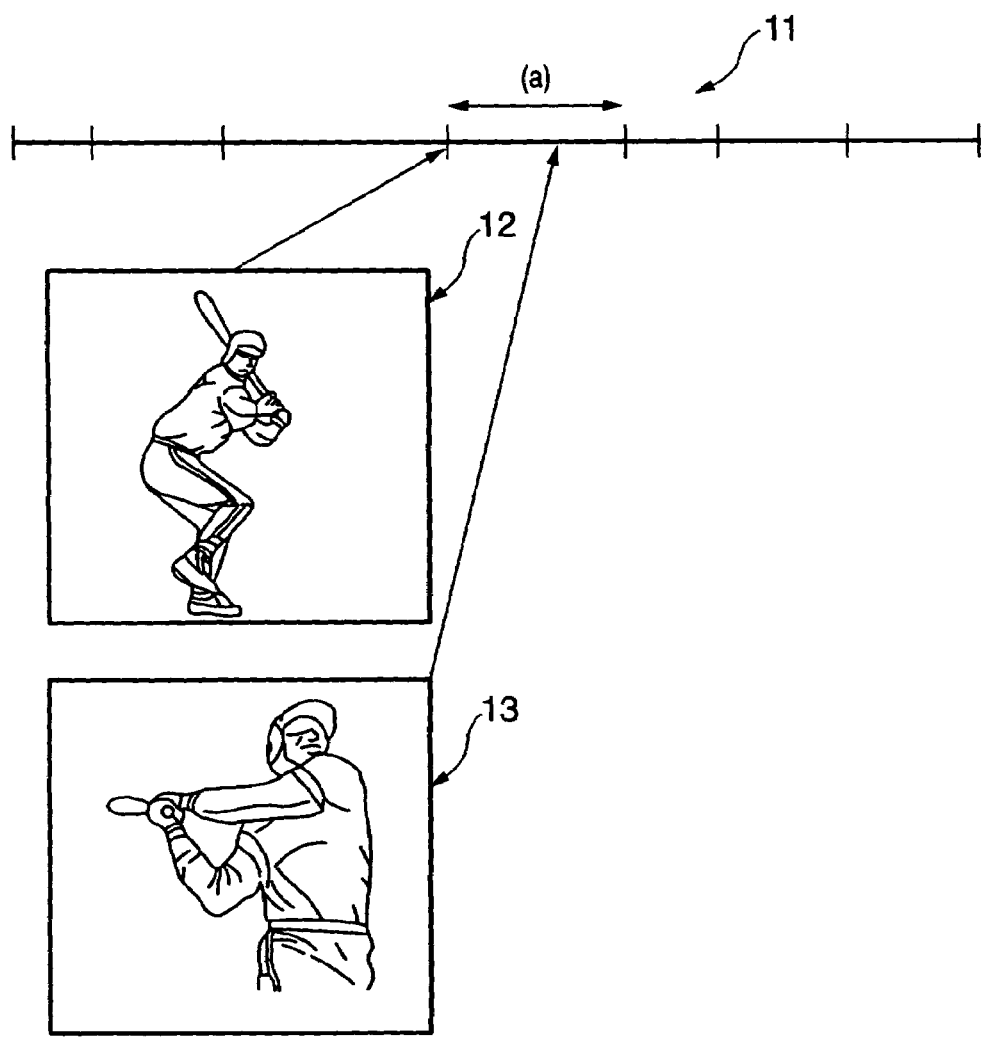
FIG. 1 is an explanatory view of problem in utilization of representative image.
Figure 2:
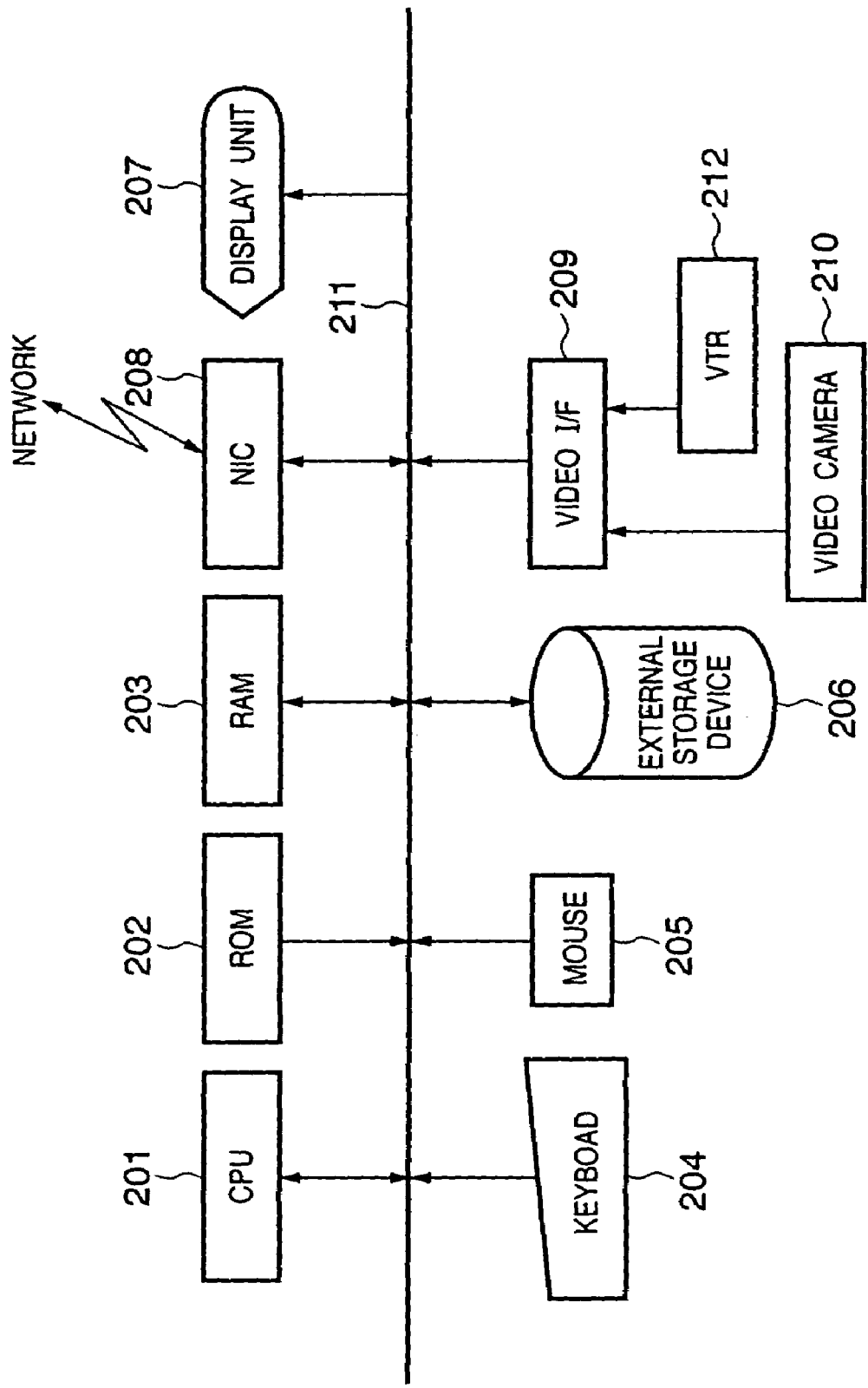
FIG. 2 is a block diagram showing a control construction of a moving image processing apparatus according to an embodiment.

FIG. 2 is a block diagram showing a control construction of a moving image processing apparatus according to the present embodiment. In FIG. 2, numeral 201 denotes a CPU which performs various controls in the moving image management apparatus. Numeral 202 denotes a ROM in which a boot program executed upon boot-up of the apparatus and various data are stored. Numeral 203 denotes a RAM in which a control program for processing by the CPU 201 is stored, and which provides a work area for execution of various controls by the CPU 201. Numeral 204 denotes a keyboard, and 205, a mouse, providing an environment for user's various input operations.

Numeral 206 denotes an external storage device comprising a hard disk, a floppy disk, an optical disk, a magneto-optic disk, a magnetic tape, non-volatile type semiconductor memory (e.g. flash memory) or the like. Numeral 207 denotes a display unit comprising a display or the like which displays a user interface upon image editing, the result of image editing and the like for the user. Numeral 208 denotes a network interface which enables communication with respective devices on a network. Numeral 209 denotes a video interface which reads a moving image from a video camera 210 and a VTR 212. Numeral 211 denotes a bus interconnecting the above respective elements.

Note that the video camera 210, the VTR 212 and the external storage device 206 are not limited to those incorporated in or directly connected to the apparatus, but devices arranged on the network can be used.

Figure 3:
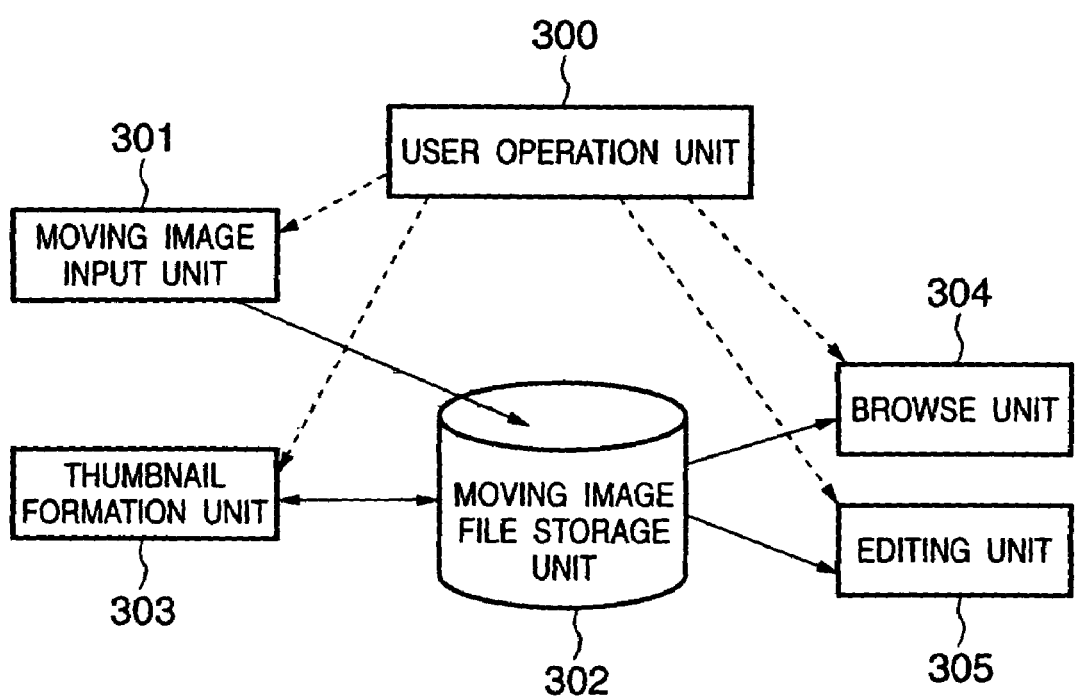
FIG. 3 is a block diagram showing a functional construction of the moving image processing apparatus according to the embodiment.

FIG. 3 is a block diagram showing a functional construction of the moving image processing apparatus according to the present embodiment. Numeral 300 denotes a user operation unit which obtains the user's designation or input via the keyboard 204, the mouse 205 and the like. Numeral 301 denotes a moving image input unit which reads a moving image from the video camera 210, the VTR 212 or the like via the video I/F 209, and inputs the image into the apparatus. Numeral 302 denotes a moving image file storage unit comprising the external storage device 206, which holds moving images inputted by the moving image input unit 301 in file format.

Numeral 303 denotes a thumbnail formation unit which presents a moving image stored in the moving image file storage unit 302 on the display unit 207, such that the user designates a desired section and a frame image in the section. The thumbnail formation unit forms a reduced image (hereinbelow, thumbnail image) based on the designated frame image, and stores it, with information on the designated section or the like, into the moving image file storage unit 302. That is, by the thumbnail formation unit 303, the user can refer to the moving image presented on the display unit 207, and designate a section in the moving image and a frame representing the section via the user operation unit 300. Then the thumbnail image based on the designated frame image is stored, with the information on the designated section or the like, into the moving image file storage unit 302.

Numeral 304 denotes a browser unit which reads a thumbnail from the moving image file storage unit 302 and displays it via the display unit 207, and reproduces a moving image corresponding to the thumbnail selected by the user. Numeral 305 denotes an editing unit which performs editing on a moving image in the moving image file storage unit 302. Further, the progress and result of the editing are displayed via the display unit 207.

Note that the functions of the above-described respective elements are realized by execution of the control program stored in the ROM 202 by the CPU 201. Otherwise, it may be arranged such that the control program is appropriately loaded from the external storage device 206 onto the RAM 203 and executed by the CPU 201.

<1. Thumbnail Storage Method>

Figure 4:
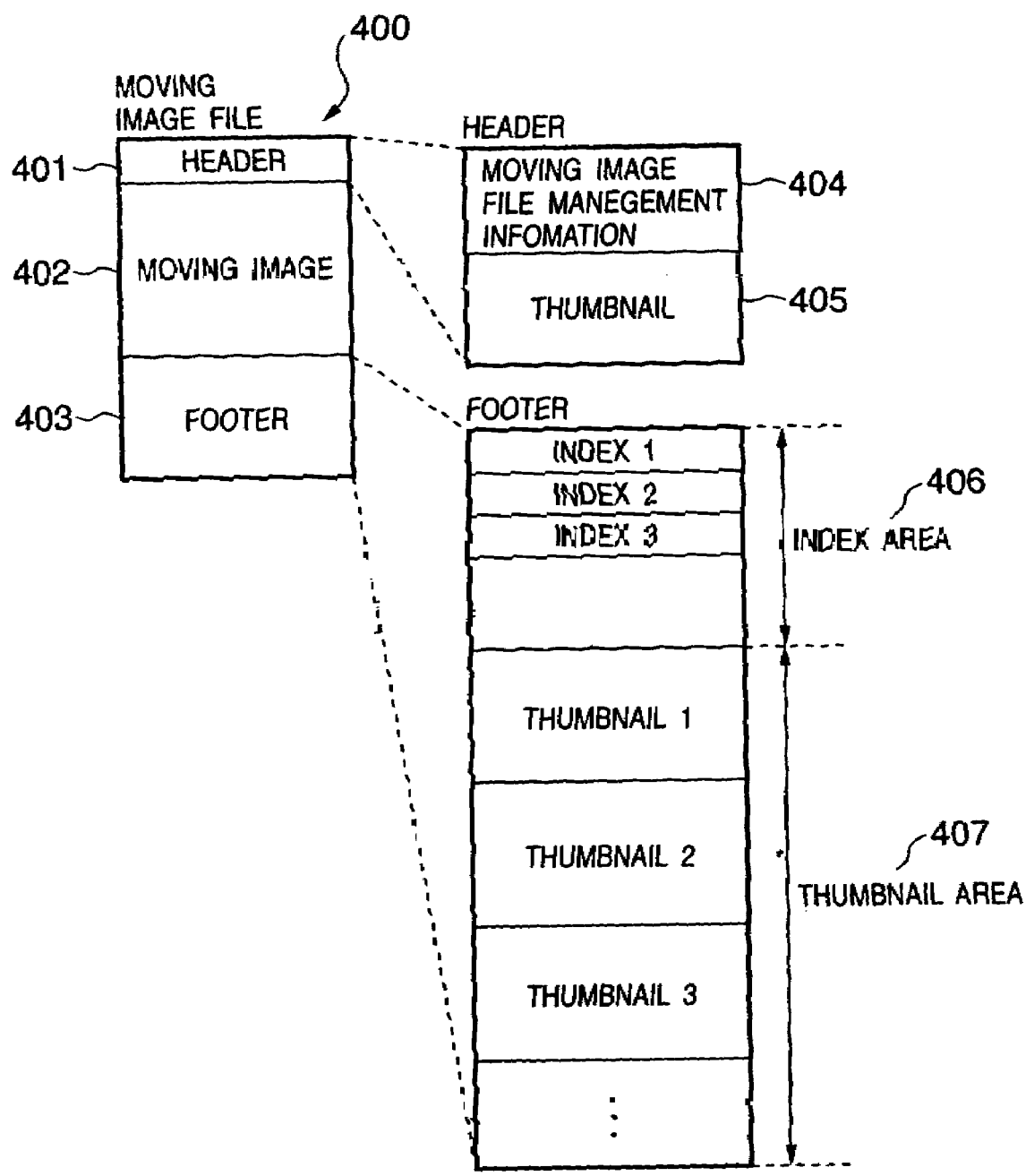
FIG. 4 is a schematic diagram showing an example of thumbnail storage status in a moving image file according to the embodiment.

FIG. 4 is a schematic diagram showing an example of thumbnail storage status in a moving image file according to the embodiment.

Numeral 400 denotes a moving image file stored on a storage medium by a moving image file storage unit 302. Note that the unit of storage is not limited to 1 moving image file, but the unit may be a shot from depression of recording button of the image sensing device to stoppage of image sensing, or may be 1 TV broadcast program. The moving image file 400 comprises a header 401 in which management information or the like is recorded, a moving image 402 in which moving image data itself is recorded, and a footer 403 in which mainly a thumbnail is recorded.

In the header 401, moving image file management information 404 on the data size, the format, the date of formation and the like of the moving image file, and 1 image of thumbnail 405 are recorded. The footer 403 has a thumbnail area 407 in which plural thumbnails can be recorded and an index area 406 in which index information on the respective thumbnails are recorded.

FIG. 5 is a table showing an example of data structure for 1 index in the index area 406 in the footer 403 in FIG. 4. In the figure, "Start Point" and "End Point" are start point and end point of a section in a moving image represented by the thumbnail. The form of the start point and the end point is not particularly limited as long as the points specify the section in the moving image, however, it is preferable that the points are described in time code or frame ID. In "Thumbnail Type ID", an ID indicating the purpose of the thumbnail is described. In the present embodiment, Thumbnail Type IDs are determined for purposes of thumbnail as follows.

Thumbnail Type ID=1: for browser
Thumbnail Type ID=2: for moving image editing
Thumbnail Type ID=3: for printing In this example, IDs are defined for application types to use the thumbnail.

Further, in "Thumbnail Offset", an offset to the thumbnail indicated by the index is described.

Figures 6A, 6B:
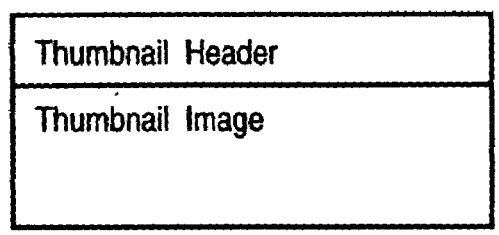
FIGS. 6A and 6B are tables showing examples of data structure of thumbnail 405 in a header 401 and 1 thumbnail in a thumbnail area 407 in the footer 403 in FIG. 4.

FIGS. 6A and 6B are tables showing examples of data structure of thumbnail 405 in the header 401 and 1 thumbnail in the thumbnail area 407 in the footer 403 in FIG. 4. In FIG. 6A, in "Thumbnail Header", management information of the thumbnail image or the like is described. Further, in "Thumbnail Image", the thumbnail image data itself is described. Further, FIG. 6B shows an example of data structure of the "Thumbnail Header". In "Thumbnail Image Offset", an offset from the head of the "Thumbnail Header" to the storage position of the thumbnail image is described. In "Thumbnail Image Size", the size of the thumbnail image is described. In "Thumbnail Key Relative Point", the frame position in the moving image as a base of the thumbnail is described as a relative position from the "Start Point".

<Thumbnail Registration Processing>

Figure 7:
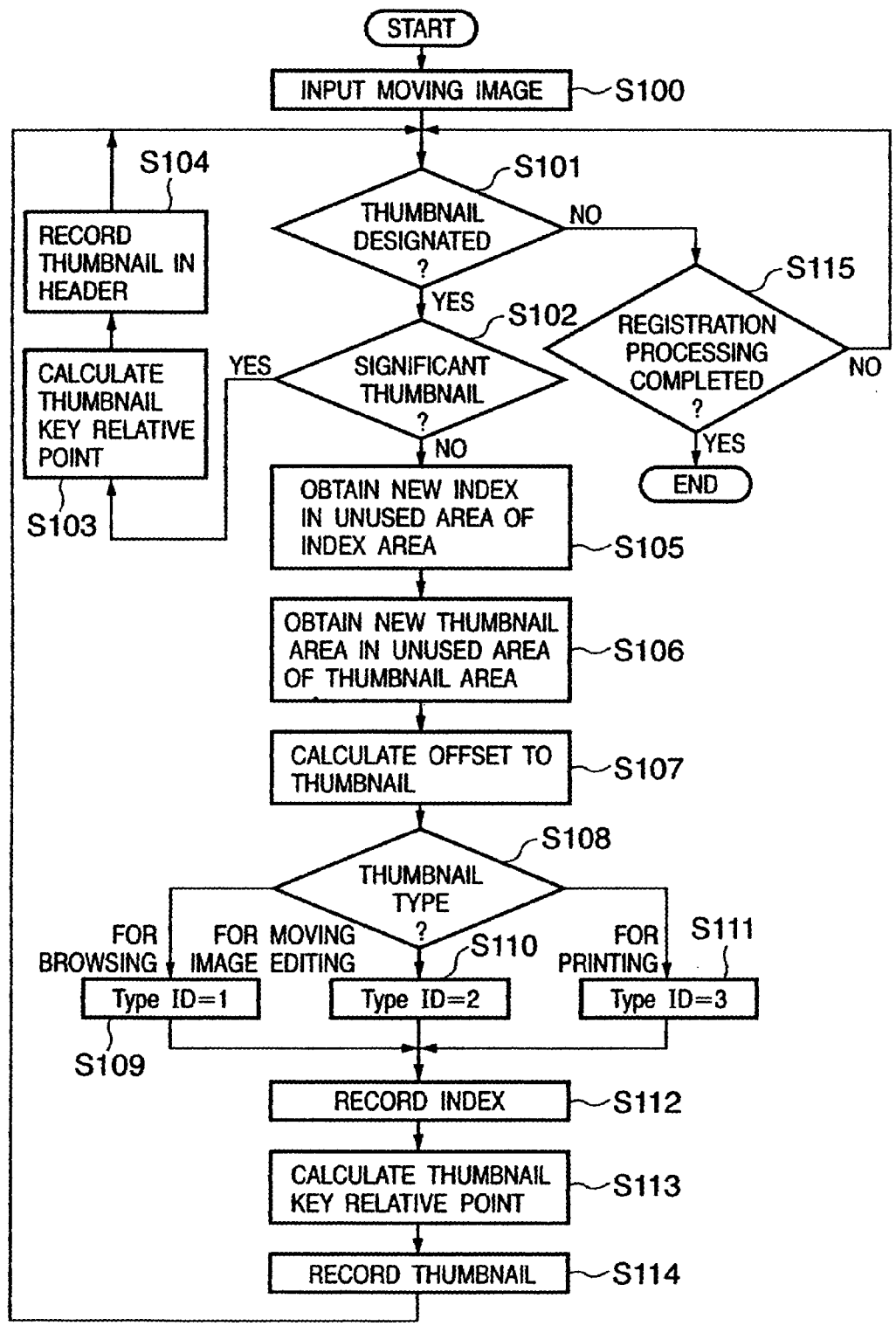
FIG. 7 is a flowchart showing an example of thumbnail registration operation according to the embodiment.

FIG. 7 is a flowchart showing an example of thumbnail registration operation according to the embodiment.

First, at step S100, the moving image input unit 301 inputs a moving image, and records it in the format of the moving image file 400 shown in FIG. 4 into the moving image file storage unit 302. At this time, an area for storing a thumbnail in the header 401 and a footer area are ensured as reserved areas (physical area of the storage medium). For example, in case of optical disk, the reserved areas are ensured in inner circumferential area. Next, at step S101, it is determined whether or not thumbnail designation has been made by the user. The thumbnail designation means designation of arbitrary frame in the moving image as a base of the thumbnail, a section in the moving image represented by the thumbnail, the purpose of the thumbnail, designation as to whether the thumbnail is important or not, and the like, made by the user utilizing the function of the apparatus at this step S101. When the user makes setups, the user sets the apparatus to a setting mode, then designates a desired section in the moving image by the keyboard or the mouse, then performs reproduction, and when an image from which the user wants to form a thumbnail is displayed, the user designates a frame to be a thumbnail by the keyboard or the mouse. In this case, the designated frame is a base image of the thumbnail, and the designated desired section is the section in the moving image represented by the thumbnail. Note that in the thumbnail setting, various methods of e.g. user's setting and automatic setting by the apparatus may be used. In the present invention, any of setting may be employed. Further, designation of the purpose of thumbnail, designation as to whether the thumbnail is important or not, may be made by the keyboard or the mouse via a predetermined user interface.

Next, at step S102, it is determined whether or not the designation that the thumbnail is important has been made. The designation of important thumbnail means that the thumbnail most properly represents the entire moving image file. If the designation of important thumbnail has been made by the user, process proceeds to step S103, at which the frame position designated for the generation of thumbnail is corrected to a relative position from the head of the moving image file, to obtain the "Thumbnail Key Relative Point". Next, at step S104, a thumbnail is generated from the designated frame, and the thumbnail, having the "Thumbnail Key Relative Point" calculated at step S103, the size of the thumbnail image (Thumbnail Image Size), and information on relative distance to the storage position of the thumbnail image (Thumbnail Image Offset) as a header, is recorded into the header 401. At this time, the header 401 is stored in a position for comparatively quick and easy access on the storage medium, e.g., in use of optical disk, in an inner peripheral portion. Then, the process returns to step S101.

On the other hand, if it is determined at step S102 that the designation of significant thumbnail has not been made, the process proceeds to step S105. At step S105, a new index is ensured in an unused area of the index area 406 in the footer 403 in the moving image file 400. Next, at step S106, a new thumbnail is ensured in an unused area of the thumbnail area

407. Next, at step S107, an offset value to the thumbnail ensured at step S106 is calculated.

Next, at step S108, the type of designated thumbnail is determined based on the purpose designated by the user. In the present embodiment, any one of browsing, moving image editing and printing is designated by the user as the purpose. The process branches to one of steps S109 to S111 in accordance with the designated type, and a corresponding Thumbnail Type ID is set. The ID setting is made by holding a table of the above-described Thumbnail Type IDs in advance and referring to the table. In the present embodiment, if the purpose is browsing, setting is made as Thumbnail Type ID=1 (S109); if the purpose is moving image editing, setting is made as Thumbnail Type ID=2 (S110); and if the purpose is printing, setting is made as Thumbnail Type ID=3 (S111). In the present embodiment, 3 types are given, however, the number of types is not limited to 3.

Next, at step S112, an index having the offset (Thumbnail Offset) calculated at step S107, the Thumbnail Type ID set at steps S108 to S111, and the Start Point and the End Point indicating the section designated by the user, is generated, and stored into the footer 403.

Next, at step S113, the position of the frame adopted as the thumbnail is corrected to a relative position from the header of the section, and the Thumbnail Key Relative Point is obtained. At step S114, a thumbnail is generated by reducing the frame designated at step S101, and the thumbnail is stored, with the Thumbnail Key Relative Point calculated at step S113, the image size (Thumbnail Image Size) of the thumbnail and information on a relative distance to the storage position of the thumbnail image (Thumbnail Image Offset) as the Thumbnail Header (FIG. 6A), into the footer 403. Next, the process returns to step S101, and if the designation of thumbnail is made again, the processing at steps S102 to S114 is repeated. Note that it is preferable that the footer 403, especially the thumbnail area 407, is stored in a continuous area on the storage medium.

Further, if it is determined at step S101 that the designation of thumbnail has not been made, the process proceeds to step S115, at which if it is determined that termination of registration processing has been instructed, the process ends. If it is determined that the termination of registration processing has not been instructed, the process returns to step S101, to repeat the above processing.

By the above processing, an significant thumbnail can be stored in a position for quick and easy access (e.g. in use of optical disk, an inner peripheral portion) on the storage medium. Further, thumbnails for different purposes can be discriminated by Thumbnail Type IDs, these thumbnails can be stored in the same file, thus management can be simplified.

<Thumbnail Utilization Processing>

Processing upon utilization of thumbnail registered by the above thumbnail registration processing will be described.

Figure 8A:
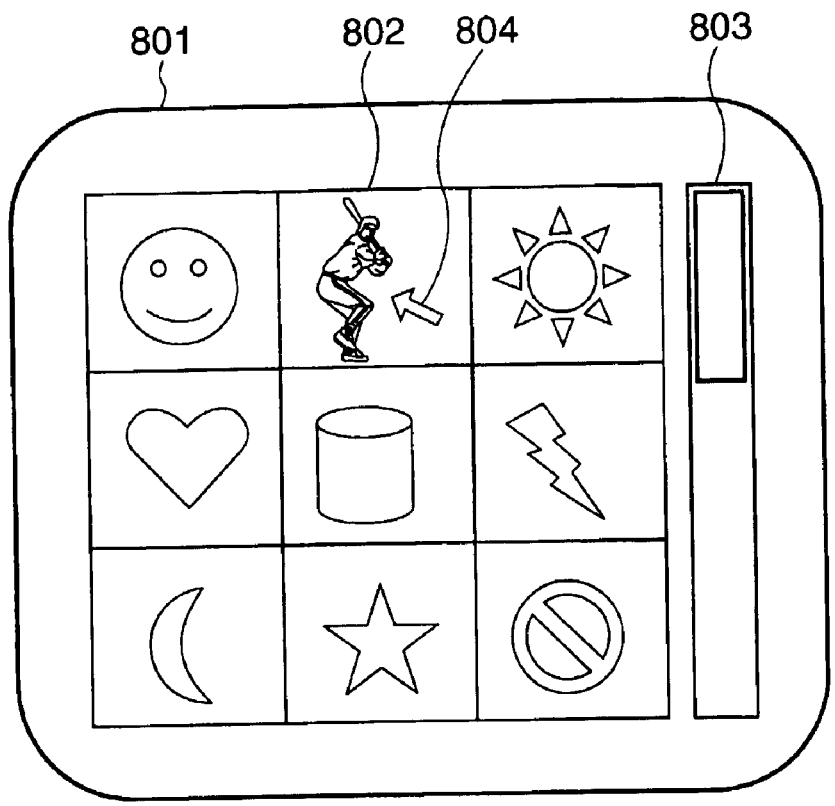
FIGS. 8A and 8B are examples of user interface upon execution of browser.
Figure 8B:
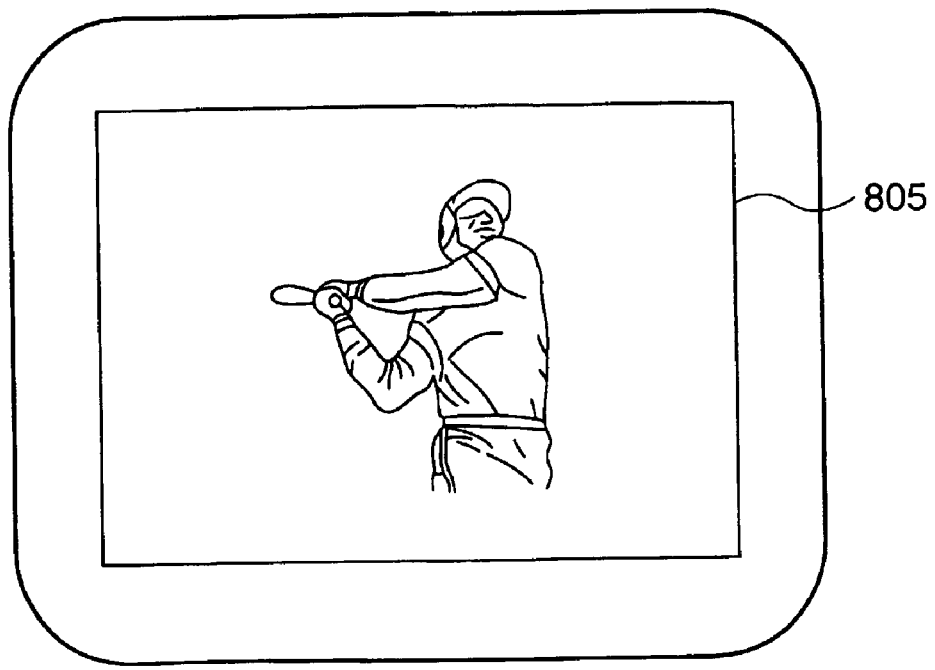

First, utilization of thumbnail in a browser will be described. FIGS. 8A and 8B are examples of user interface of a browser. In FIG. 8A, numeral 801 denotes an entire display area of the browser. Numeral 802 denotes an area where arrayed thumbnails are displayed. The thumbnails are displayed from the top line, from the left to the right. Numeral 803 denotes a scroll bar. In a case where the thumbnails cannot be displayed within the thumbnail display area 802 at once, they can be sequentially displayed by dragging in the scroll bar. Numeral 804 denotes a pointer. The user moves the pointer 804 by operation at the user operation unit 300, to designate a desired thumbnail in the thumbnail display area 802. When the thumbnail is selected by the pointer 804, the display screen image changes to a moving-image reproduction screen image 805 as shown in FIG. 8B, and moving image reproduction is started.

Figure 9A:
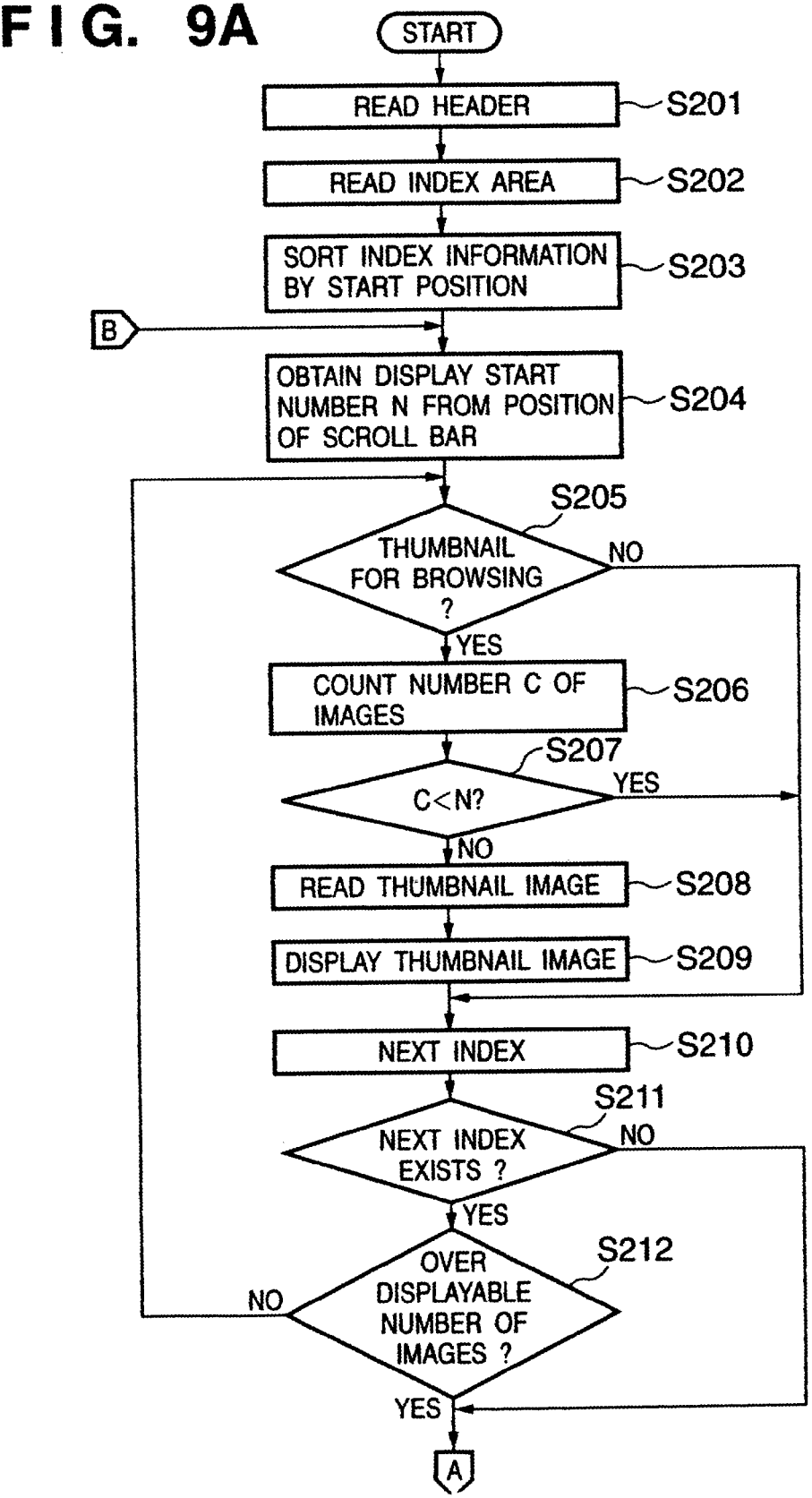
FIGS. 9A and 9B are flowcharts showing processing upon browser operation in the moving image management apparatus.
Figure 9B:
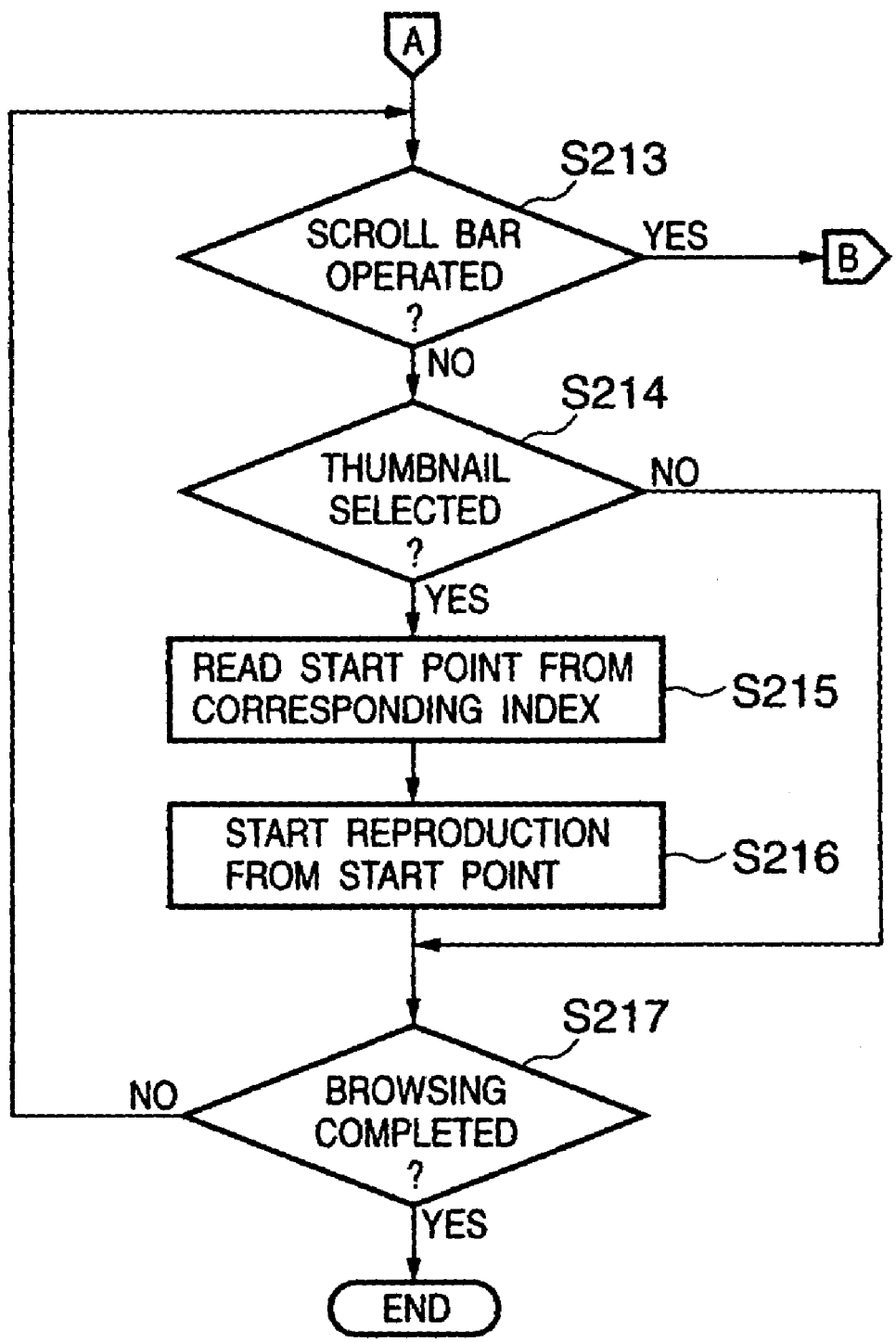

Hereinbelow, processing to realize the utilization of thumbnail in a browser will be described. FIGS. 9A and 9B are flowcharts showing processing upon browser operation in the moving image management apparatus. Note that the processing shown in FIGS. 9A and 9B is executed when browser processing is started in the moving image management apparatus and a moving image file to be browsed is designated. Note that upon designation of moving image file to be browsed, the thumbnails representing the respective moving image files (thumbnails stored in the headers of the respective moving image files) are displayed in the thumbnail display area in FIG. 8A, and a desired moving image file is selected by designating a desired thumbnail by the pointer 804. When the desired moving image file is selected, the processing shown in FIGS. 9A and 9B is started.

First, at step S201, the browse unit 304 reads the header 401 of the moving image file 400 selected by the above operation among the moving image files stored by the moving image file storage unit 302. Then the browse unit obtains various basic management information such as the file size from the moving image file management information 404, and stores the information into the memory (RAM 203). Next, at step S202, the unit reads the index area 406 in the footer 403, and performs sorting on the indexes included in the index area 406 read at step S202 by start position (Start Point in FIG. 5) in ascending order, for display of thumbnails to be described later in time sequential order.

Next, at step S204, a thumbnail display start number N is obtained from the current position of the bar of the scroll bar 803. For example, if the scroll bar 803 is at an upper end (as shown in FIG. 8), display start number N=1 holds. Accordingly, display is started from the first thumbnail.

Next, by performing the following processing at steps S205 to S212 sequentially from the head index, thumbnails for browsing are displayed in the thumbnail display area 802 from the N-th and subsequent thumbnails.

First, at step S205, it is checked whether or not the thumbnail in the index is for browsing by checking the Thumbnail Type ID in the index. As described above, assuming that Thumbnail Type ID=1 to 3 are defined, it is determined that a thumbnail for which Thumbnail Type ID=1 is set is a thumbnail for browsing. Note that upon start of processing, checking is started from the head after the sorting.

If it is determined at step S205 that it is a thumbnail for browser, the process proceeds to step S206. At step S206, the number C (the order in the thumbnails for browser) is counted. At step S207, it is checked whether or not the counted number C is less than the display start number N (C<N). This processing is made for skipping thumbnails before the number N without display.

If the number C is equal to or greater than the display start number N, the thumbnail image is read for thumbnail display at the next step S208. Next, at step S209, the thumbnail image is displayed in the thumbnail display area 802, and the process proceeds to step S210. On the other hand, if it is determined at step S205 that the thumbnail is not for browsing, or if it is determined at step S207 that the number C is less than the number N, the process proceeds to step S210.

At step S210, the processing subject is moved to the next index to process the next thumbnail. In a case where the immediately previous processing has been performed on the last index and there is no next index, the process proceeds to step S213. If the next index exists, the process proceeds to step S212, at which it is checked whether or not the number has exceeded the number of displayable thumbnails in the thumbnail display area 802. For example, in the example in FIG. 8, the number of displayable thumbnails is 9. If the number is not over the number of displayable thumbnails, the process returns to step S205. That is, the processing at steps S205 to S210 is performed to sequentially check the indexes until there is no index to be processed or the number exceeds the number of displayable thumbnails.

If there is no index to be processed or the number exceeds the number of displayable thumbnails in the thumbnail display area 802, the process proceeds to step S213. At step S213, it is checked whether or not the scroll bar has been operated by the user. If it has been operated, the processing at steps S204 to S212 is repeated, thereby a thumbnail corresponding to the position of the operated scroll bar is displayed. If the scroll bar has not been operated, the process proceeds to step S214.

Next, at step S214, it is determined whether or not one of the thumbnails displayed in the thumbnail display area 802 has been selected by the user. If a thumbnail has been selected, the process proceeds to step S215, at which the Start Point is read from the index corresponding to the selected thumbnail. Next, at step S216, moving image reproduction is started from the Start Point, and the moving image is displayed in the moving image reproduction screen image 805. Thereafter, the process proceeds to step S217. On the other hand, if it is determined at step S214 that a thumbnail has not been selected, the process proceeds to step S217.

At step S217, it is determined whether or not termination of browsing by the browse unit 304 has been instructed. If it is determined that termination has not been instructed, the process returns to step S213. If it is determined that termination has been instructed, the process ends.

Note that in the above example, when a thumbnail is selected, the Start Point is obtained from the corresponding index and reproduction is started from the position, however, the reproduction is not limited to this arrangement. It may be arranged such that the Start Point and the End Point are obtained from the index corresponding to the selected thumbnail and only the section is reproduced.

In the above description, browsing is made in one moving image file for the sake of simplicity of explanation, however, even in thumbnail selection in plural moving image files, the selection can be made by repeating the processing to display a thumbnail for the respective moving image files.

By the above processing, the browse unit 304 reads only thumbnail(s) for browsing from the thumbnail area 407 and utilizes it.

Figure 10:
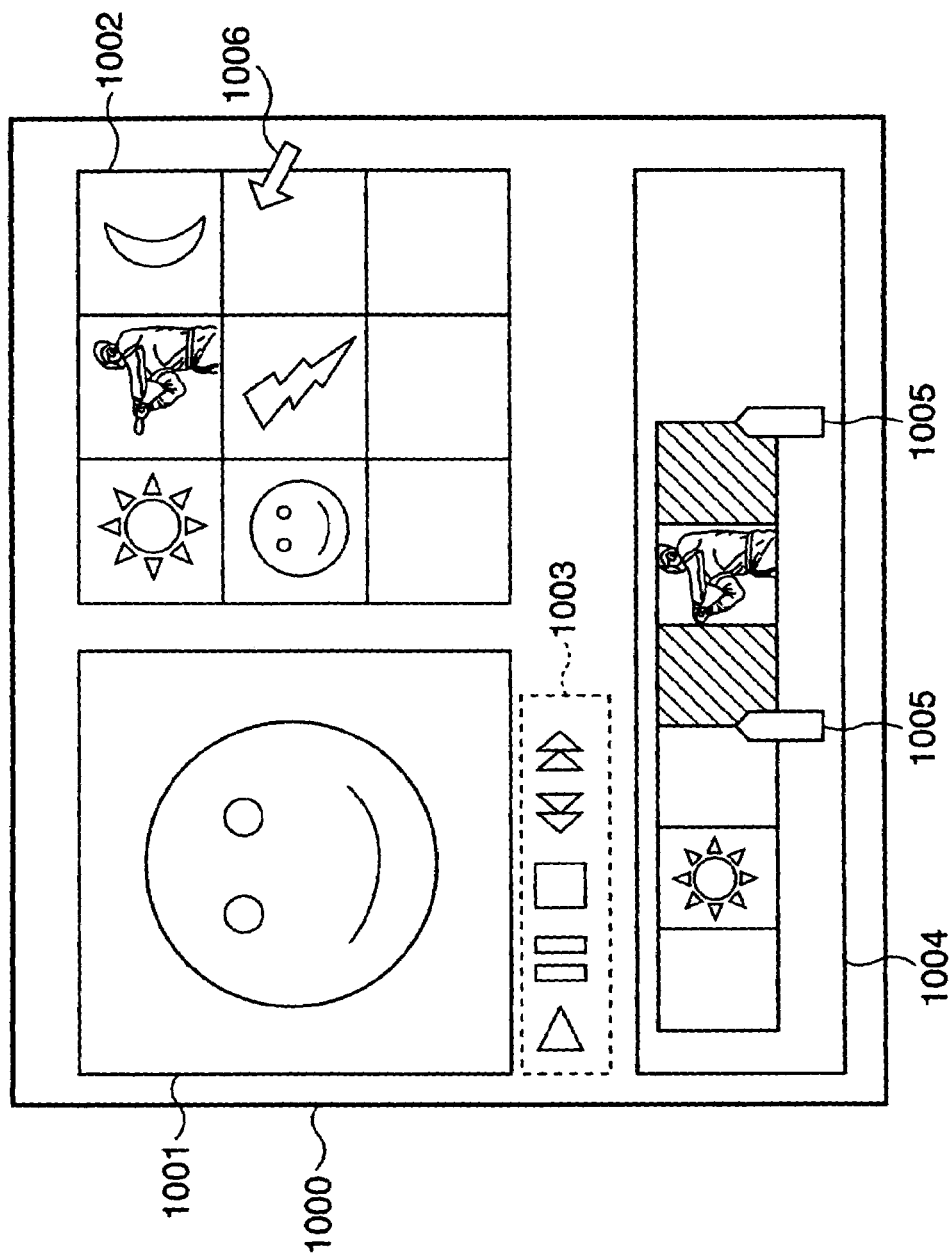
FIG. 10 is an example of the user interface upon moving image editing by an editing unit 305.

Next, utilization of thumbnail in moving image editing will be described. In this example, the following case is supposed. That is, thumbnails for editing has been added to each moving image file beforehand. These thumbnails are utilized to collect favorite scenes which are scattered in the plurality of files, in order to create single moving image data or create a play-list describing reproduction designation information of a plurality of moving image files. FIG. 10 is an example of the user interface upon moving image editing by an editing unit 305. Numeral 1000 denotes an editing operation window in which an editing operation is performed. Numeral 1001 denotes a reproduction window in which a selected moving image file or the result of editing is reproduced for checking. Numeral 1002 denotes a moving image file window for display of a list of thumbnails in the headers of the respective moving image files. Numeral 1003 denotes operation buttons for operation of moving image reproduced in the reproduction window 1001, for "reproduction, temporary stoppage, stoppage, reverse and fast-forward" operations from the left.

Numeral 1004 denotes a scene designation window in which selected moving image files are arrayed for designation of section in the respective moving images. Note that as display of the respective moving image files, thumbnail images are overlay-displayed for the user's recognition. Numeral 1005 denotes a scene designation bar. The start point and the end point of selected clip (hatched portion) can be designated by operating the scene designation bar. For this purpose, contents of frames corresponding to a portion of the moving image indicated by the scene designation bar 1005, are displayed in the reproduction window 1001 while the scene designation bar 1005 is operated. Accordingly, the user can accurately specify the start point and the end point by confirming the image displayed in the reproduction window 1001 and operating the scene designation bar 1005.

Numeral 1006 denotes a pointer. The user moves the pointer 1006 by operating the user operation unit 300, to designate selection of various buttons and designation of operation. In an operation procedure, a moving image files are selected from the moving image file window 1002 and dragged and dropped into the scene designation window 1004 in the order of reproduction. Then, the start point and the end point area corrected by using the scene designation bar 1005. At this time, the user performs moving image reproduction in the reproduction window 1001 by operating the operation unit 1003 in accordance with necessity thereby checks the image.

Figure 11:
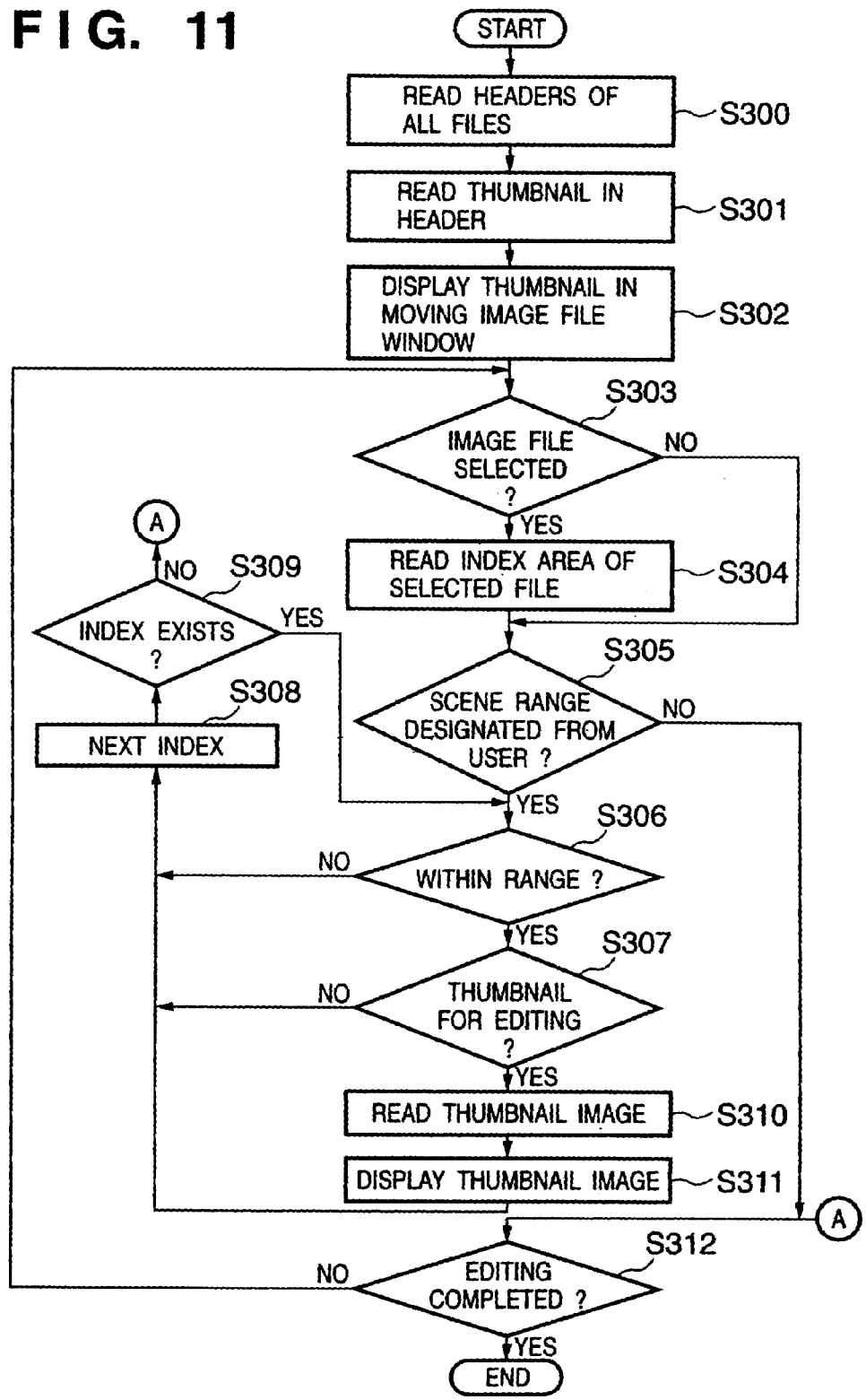
FIG. 11 is a flowchart showing a thumbnail display operation upon the moving image editing by the editing unit 305.

FIG. 11 is a flowchart showing a thumbnail display operation upon the moving image editing by the editing unit 305. Note that the processing in FIG. 11 is started when moving image editing processing is executed in the moving image management apparatus.

First, at step S300, the editing unit 305 reads the header 401 of all the moving image files from the moving image file storage unit 302. Next, at step S301, the editing unit reads the thumbnail 405 in the header 401 of the respective files. Then at step S302, the editing unit displays the thumbnails in the headers as representative images of the respective moving image files in the moving image file window 1002.

Next, at step S303, it is determined whether or not a moving image file has been selected. In the present embodiment, it is determined whether or not the moving image file(s) has been dragged and dropped from the moving image file window 1002 to the scene designation window 1004 by operation of the pointer 1006. If moving file(s) has been selected, the process proceeds to step S304, at which the index area 406 is read from the footer in the moving image file selected by the user. Then, bar display is performed to display the moving image file in the scene designation window 1004. At this time, the entire moving image is the range of designation for the selected moving image file. Further, at this time, a representative thumbnail of the moving image file is displayed as the bar display of the moving image file displayed in the scene designation window 1004. On the other hand if it is determined at step S303 that moving image file selection has not been made, step S304 is skipped.

Next, at step S305, it is checked whether or not the user has designated a range of scene regarding the moving image file by the scene designation bar 1005 in the scene designation window 1004. If the range designation has been made, thumbnail(s) for editing existing within the range designated by the user is extracted and displayed at steps S306 to S311.

First, at step S306, the Start Point and the End Point in the index (upon start of processing, the head index) are referred to, and it is determined whether or not a section indicated by the Start Point and the End Point is within the range designated by the user. If it is within the range, the process proceeds to step S307, at which it is determined whether or not the thumbnail corresponding to the index is a thumbnail for editing. The checking is made by checking the Thumbnail Type ID in the index. In a case where the Thumbnail Type IDs are defined as described above, if Thumbnail Type ID=2 holds, it is determined that the thumbnail is for editing. If it is a thumbnail for editing, the process proceeds to step S310.

On the other hand, if it is determined at step S306 that the section corresponding to the index is not within the range designated by the user, or if it is determined at step S307 that the thumbnail is not for editing, the process proceeds to step S308 to process the next index. At step S309, it is determined whether or not the next index exists. If the next index exists, the processing at steps S306 and S307 is repeated.

If the condition at step S307 is satisfied, the process proceeds to step S310, at which a thumbnail image corresponding to the index is read. Then at step S311, the thumbnail image is displayed. For example, as shown in FIG. 10, in the scene designation window 1004, the thumbnail image is overlay-displayed on a bar indicating the scene. By this display, the user can easily recognize the scene in the designated range. Thereafter, the process proceeds to step S308, to repeat the above-described processing on the next index.

By the above processing, thumbnails of all the sections within the range designated by the user are overlay-displayed on the bars indicating the scenes. Note that the display range of thumbnail is an area designated by 2 scene designation bars 1005. If the size of area between the designation bars is insufficient, a part of the thumbnail may be overlaid or a scroll bar may be displayed for scrollable display.

If it is determined at step S305 that a scene range has not been designated by the user, or if it is determined at step S309 that there is no index to be processed, the process proceeds to step S312. At step S312, it is determined whether or not termination of the moving image editing operation has been instructed. If the termination of the editing operation has not been instructed (the moving image editing is performed), the process returns to step S303 to repeat the above processing. On the other hand, if it is determined that the termination of the editing operation has been instructed, the process ends.

By the above processing, upon file selection, the editing unit 305 can use a significant thumbnail stored in the header, and utilize only thumbnails for moving image editing corresponding to the designated range from the thumbnail area 407.

Figure 12:
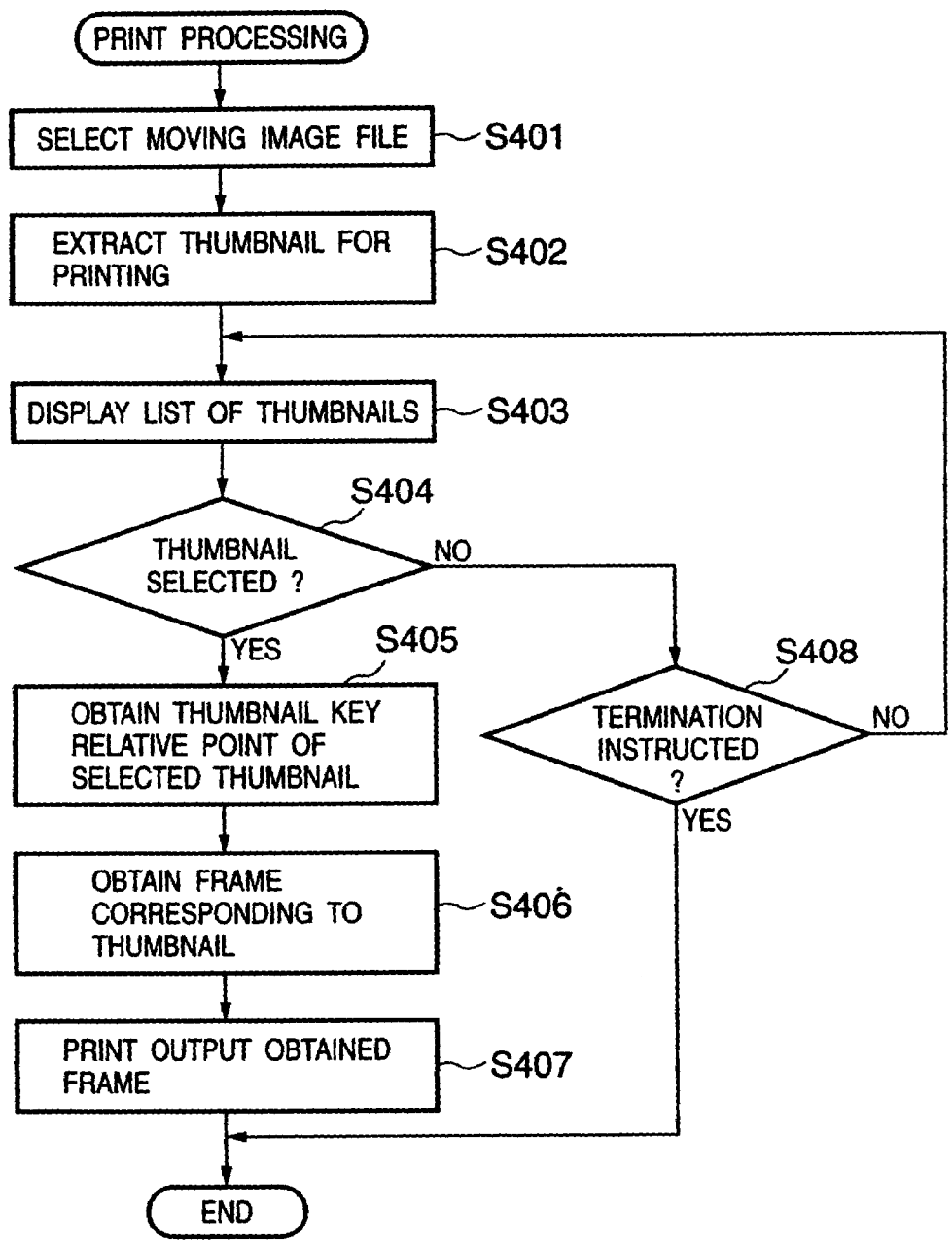
FIG. 12 is a flowchart explaining utilization of thumbnail in print operation.

Note that in the above embodiment, the browsing and moving image editing have been described as utilization of thumbnail images, however, the usage is not limited to these 2 operations, but thumbnail images can be used for various purposes such as printing of frame image corresponding to a selected thumbnail. For example, if a frame image corresponding to a selected thumbnail is printed, processing as shown in the flowchart of FIG. 12 is performed. First, a thumbnail is obtained from the header 401 of the respective moving image files, and the thumbnails are displayed in a list, then a desired moving image file (moving image data) is designated by the user (S401). Among the thumbnails corresponding to the designated image data (thumbnails recorded in the footer), thumbnails where the Thumbnail Type ID is "3" are extracted and displayed (S402 and S403). In the subsequent processing, one of the thumbnail is selected, and a frame as a base of the selected thumbnail is printed. That is, an image of the frame specified by the Thumbnail Key Relative Point as shown in FIG. 6 of the designated thumbnail is obtained (S404 to S406), and it is outputted for printing (S407). Accordingly, another function such as a printing unit may be added to the moving image processing apparatus in FIG. 3. Note that if selection from the displayed thumbnail is not performed and termination is instructed, the process ends (S404 and S408).

Note that in the above embodiment, the browsing unit and the editing unit are provided as functions for utilizing thumbnails, however, 3 or more functions including the above-described printing unit or the like, or only one of them, or another combination of other functions may be used.

Note that in the above embodiment, the moving image processing shown in FIG. 3 is a single apparatus including the moving image input unit 301, the thumbnail formation unit 303, the browse unit 304, and the editing unit 305. However, the moving image processing apparatus may be constructed as plural apparatuses of respective functions, including the above-described printing unit, or apparatuses having combinations of several functions. In such case, a moving image file including thumbnails may be transmitted among the respective apparatuses via a storage medium or communication means such as IEEE 1394.

Note that in the above embodiment, since there is no index for the header thumbnails, the header thumbnails do not have the Start Point, the End Point and the Thumbnail Type ID, however, these information may be held as management information. In this case, a number or the like indicating the purpose of thumbnail is stored, and it can be utilized in various applications.

Note that in the above embodiment, the thumbnail recorded in the header (thumbnail representing the file) is not recorded in the footer, but the thumbnail may be recorded in the header and the footer.

Further, if one thumbnail is used for plural purposes (e.g., browsing and editing), such plural purposes can be designated by deciding a value stored in the Thumbnail Type ID to an appropriate value. Further, according to operation purposes, thumbnail can be properly utilized. For example, head image of a certain scene is used for thumbnail for browsing while representative image of the scene is used for thumbnail for editing.

As described above, according to the present embodiment, as thumbnails for different purposes can be stored in 1 file, management of the thumbnails is simplified. Further, upon use of the thumbnails, only thumbnail(s) corresponding to the purpose can be utilized by referring to the type information attached to the thumbnails (Thumbnail Type ID).

Further, the object of the present invention can be also achieved by providing a storage medium storing program code for performing the aforesaid processes to a system or an apparatus, reading the program code by a computer (e.g., CPU, MPU) of the system or apparatus from the storage medium, then executing the program.

In this case, the program code read from the storage medium realize the functions according to the embodiment, and the storage medium storing the program code constitutes the invention.

Further, the storage medium, such as a floppy disk, a hard disk, an optical disk, a magneto-optical disk, a CD-ROM, a CD-R, a magnetic tape, a non-volatile type memory card, and a ROM can be used for providing the program code.

Furthermore, besides aforesaid functions according to the above embodiment are realized by executing the program code which are read by a computer, the present invention includes a case where an OS (operating system) or the like working on the computer performs a part or entire processes in accordance with designations of the program code to realize functions according to the above embodiment.

Furthermore, the present invention also includes a case where, after the program code read from the storage medium is written in a function expansion board which is inserted into the computer or in a memory provided in a function expansion unit which is connected to the computer, CPU or the like contained in the function expansion board or unit performs a part or entire process in accordance with designations of the program code and realizes functions of the above embodiment.

EFFECT OF INVENTION

As described above, according to the present invention, operability of moving image data using a representative image is improved upon execution of various moving image data processing by adding a type attribute to a representative image, and management of representative images can be simplified.

As many apparently widely different embodiments of the present invention can be made without departing from the spirit and scope thereof, it is to be understood that the invention is not limited to the specific embodiments thereof except as defined in the appended claims.

The invention claimed is:

1. A moving image management apparatus for management of plural moving images recorded on a storage medium in correspondence with one or plural representative images, comprising:
   a unit configured to record a representative image representing an arbitrary section or the whole of a moving image;
   a unit configured to record information indicating the section or the whole of the moving image represented by the representative image in correspondence with the representative image;
   a unit configured to record information indicating a position of an image as a base of the representative image in correspondence with the representative image;
   a unit configured to record information indicating a purpose of use of the representative image as attribute information in correspondence with the representative image, the purpose of use indicating a function selected from functions applicable to the moving image; and
   a unit configured to select only the representative image corresponding to the purpose of use based on the attribute information,
   wherein in the case the representative image is designated by a user, it is interpreted that the section or the whole of the moving image represented by the representative image is selected.

2. The moving image management apparatus according to claim 1, wherein when the representative image is designated by the user, it is interpreted that the section or the whole of the moving image represented by the representative image is selected, and a function corresponding to the purpose is applied to the selected section or the whole of the moving image.

3. The moving image management apparatus according to claim 2, wherein said unit configured to select only the representative image corresponding to the purpose based on the attribute information selects a representative image having the attribute information corresponding to a browsing operation,
   wherein said apparatus has a display unit that displays the representative image, having the attribute information corresponding to the print operation, and
   wherein an application of a function corresponding to the purpose to the selected section or the whole of the moving image is reproduction means for, when a desired representative image is designated from representative images displayed by said display unit, reproducing a corresponding moving image based on section information added to the representative image.

4. The moving image management apparatus according to claim 2, wherein in a print operation to print a desired frame in a desired moving image, said unit configured to select only the representative image corresponding to the purpose based on the attribute information selects a representative image having the attribute information corresponding to the print operation from representative images corresponding to the desired moving image,
   wherein said apparatus has a display unit that displays the representative image having the attribute information corresponding to the print operation, and
   wherein an application of a function corresponding to a designated purpose to the selected section or the whole of the moving image when a desired representative image is designated from representative images displayed by said display unit, is output processing for, when a desired representative image is designated from representative images displayed by said display unit, referring to the information indicating a position of an image as a base of the representative image, and outputting a desired frame for print output.

5. The moving image management apparatus according to claim 1, further comprising:
   a unit configured to classify only the representative image for each purpose based on the attribute information.

6. The moving image management apparatus according to claim 5, wherein when the representative image is designated by the user, it is interpreted that the section or the whole of the moving image represented by the representative image is selected, and a function corresponding to the purpose is applied to the selected section or the whole of the moving image.

7. The moving image management apparatus according to claim 1, wherein when the information indicating the section or the whole of the moving image represented by the representative image and the attribute information are recorded on the storage medium, they are recorded, by representative image, in a particular continuous portion.

8. The moving image management apparatus according to claim 7, wherein when the information indicating a position of an image as a base of the representative image and the representative image are recorded on the storage medium, they are recorded, by representative image, in a particular portion.

9. The moving image management apparatus according to claim 8, wherein the particular portion is a continuous area on the storage medium.

10. The moving image management apparatus according to claim 8, wherein only significant information of the information indicating a position of an image as a base of the representative image and the representative image is recorded in a portion for easy storage and access.

11. The moving image management apparatus according to claim 1, wherein in said unit configured to record information indicating a purpose of the representative image as attribute information, the attribute information is an identification number previously defined for a purpose.

12. The moving image management apparatus according to claim 1, wherein if an editing range is designated in a desired moving image, said unit configured to select only the representative image corresponding to the purpose based on the attribute information selects a representative image having the attribute information corresponding to an editing operation and within the editing range, and wherein said apparatus has a display unit that displays the representative image within the editing range.

13. A moving image management apparatus for management of plural moving images recorded on a storage medium in correspondence with one or plural representative images, comprising:

a generation unit configured to generate a representative image representing an arbitrary section or the whole of a moving image;

a first recording unit configured to record information indicating the section or the whole of the moving image represented by the representative image in correspondence with the representative image;

a second recording unit configured to record information indicating a position of an image as a base of the representative image in correspondence with the representative image;

an adding unit configured to add information indicating a purpose of use of the representative image as attribute information image, the purpose of use indicating a function selected from functions applicable to the moving image;

a unit configured to record the attribute information added by said adding unit in correspondence with the representative image; and a unit configured to select only the representative image corresponding to the purpose of use based on the attribute information.

14. The moving image management apparatus according to claim 13, wherein when the representative image is designated by the user, it is interpreted that the section or the whole of the moving image represented by the representative image is selected, and a function corresponding to the purpose is applied to the selected section or the whole of the moving image.

15. The moving image management apparatus according to claim 14, wherein said unit configured to select only the representative image corresponding to the purpose based on the attribute information selects a representative image having the attribute information corresponding to a browsing operation, wherein said apparatus has a display unit configured to display the representative image, and wherein an application of a function corresponding to the purpose to the selected section or the whole of the moving image is reproduction processing for, when a desired representative image is designated from representative images displayed by said display unit, reproducing a corresponding moving image based on section information added to the representative image.

16. The moving image management apparatus according to claim 14, wherein in a print operation to print a desired frame in a desired moving image, said unit configured to select only the representative image corresponding to the purpose based on the attribute information selects a representative image having the attribute information corresponding to the print operation from representative images corresponding to the desired moving image, wherein said apparatus has a display unit configured to display the representative image having the said attribute information corresponding to the print operation, and wherein an application of a function corresponding to a designated purpose to the selected section or the whole of the moving image when a desired representative image is designated from representative images displayed by said display unit, is output processing for, when a desired representative image is designated from representative images displayed by said display unit, referring to the information indicating a position of an image as a base of the representative image, and outputting a desired frame for print output.

17. The moving image management apparatus according to claim 13, further comprising:

a unit configured to classify means for classifying only the representative image for each purpose based on the attribute information.

18. The moving image management apparatus according to claim 17, wherein when the representative image is designated by the user, it is interpreted that the section or the whole of the moving image represented by the representative image is selected, and a function corresponding to the purpose is applied to the selected section or the whole of the moving image.

19. The moving image management apparatus according to claim 13, wherein when the information indicating the section or the whole of the moving image represented by the representative image and the attribute information are recorded on the storage medium, they are recorded, by representative image, in a particular continuous portion.

20. The moving image management apparatus according to claim 19, wherein when the information indicating a position of an image as a base of the representative image and the representative image are recorded on the storage medium, they are recorded, by representative image, in a particular portion.

21. The moving image management apparatus according to claim 20, wherein the particular portion is a continuous area on the storage medium.

22. The moving image management apparatus according to claim 20, wherein only significant information of the information indicating a position of an image as a base of the representative image and the representative image is recorded in a portion for easy storage and access.

23. The moving image management apparatus according to claim 13, wherein in said unit configured to record information indicating a purpose of the representative image as attribute information, the attribute information is an identification number previously defined for purpose.

24. The moving image management apparatus according to claim 13, wherein if an editing range is designated in a desired moving image, said unit configured to select only the representative image corresponding to the purpose based on the attribute information selects a representative image having the attribute information corresponding to an editing operation and within the editing range, and
wherein said apparatus has a display unit configured to display the representative image within the editing range.

25. A moving image management method for management of plural moving images recorded on a storage medium in correspondence with one or plural representative images, comprising:
a step of recording a representative image representing an arbitrary section or the whole of a moving image;
a step of recording information indicating the section or the whole of the moving image represented by the representative image in correspondence with the representative image;
a step of recording information indicating a position of an image as a base of the representative image in correspondence with the said representative image;
a step of recording information indicating a purpose of use of the representative image as attribute information in correspondence with the representative image, the purpose of use indicating a function selected from functions applicable to the moving image; and
a step of selecting only the representative image corresponding to the purpose of use based on the attribute information,
wherein in the case the representative image is designated by a user, it is interpreted that the section or the whole of the moving image represented by the representative image is selected.

26. The moving image management method according to claim 25, when the representative image is designated by the user, it is interpreted that the section or the whole of the moving image represented by the representative image is selected, and a function corresponding to the purpose is applied to the selected section or the whole of the moving image.

27. The moving image management method according to claim 26, wherein at said step of selecting only the representative image corresponding to the purpose based on the attribute information, a representative image having the attribute information corresponding to a browsing operation is selected,
wherein said method has a display step of displaying the representative image, and
wherein an application of a function corresponding to the purpose to the selected section or the whole of the moving image is a reproduction step of, when a desired representative image is designated from representative images displayed at said display step, reproducing a corresponding moving image based on section information added to the representative image.

28. The moving image management method according to claim 26, wherein in a print operation to print a desired frame in a desired moving image, at said step of selecting only the representative image corresponding to the purpose based on the attribute information, a representative image having the attribute information corresponding to the print operation is selected from representative images corresponding to the desired moving image,
wherein said method has a display step of displaying the representative image having the attribute information corresponding to the print operation, and
wherein an application of a function corresponding to a designated purpose to the selected section or the whole of the moving image when a desired representative image is designated from representative images displayed at said display step is an output step of, when a desired representative image is designated from representative images displayed at said display step, referring to the information indicating a position of an image as a base of the representative image, and outputting a desired frame for print output.

29. The moving image management method according to claim 25, further comprising:
a step of classifying only the representative image for each purpose based on the attribute information.

30. The moving image management method according to claim 29, wherein when the representative image is designated by the user, it is interpreted that the section or the whole of the moving image represented by the representative image is selected, and a function corresponding to the purpose is applied to the selected section or the whole of the moving image.

31. The moving image management method according to claim 25, wherein when the information indicating the section or the whole of the moving image represented by the representative image and the attribute information are recorded on the storage medium, they are recorded, by representative image, in a particular continuous portion.

32. The moving image management method according to claim 31, wherein when the information indicating a position of an image as a base of the representative image and the representative image are recorded on the storage medium, they are recorded, by representative image, in a particular portion.

33. The moving image management method according to claim 32, wherein the particular portion is a continuous area on the storage medium.

34. The moving image management method according to claim 32, wherein only significant information of the information indicating a position of an image as a base of the representative image and the representative image is recorded in a portion for easily storage and access.

35. The moving image management method according to claim 25, wherein at said step of recording information indicating a purpose of the representative image as attribute information, the attribute information is an identification number previously defined for a purpose.

36. The moving image management method according to claim 25, wherein if an editing range is designated in a desired moving image, at said step of selecting only the representative image corresponding to the purpose based on the attribute information, a representative image having the attribute information corresponding to an editing operation and within the editing range is selected, and
wherein the method has a display step of displaying the representative image within the editing range.

37. A storage medium holding a control program for executing the moving image management method according to claim 25 by a computer.

38. A control program for executing the moving image management method according to claim 25 by a computer.

39. A moving image management method for management of plural moving images recorded on a storage medium in correspondence with one or plural representative images, comprising:
a generation step of generating a representative image representing an arbitrary section or the whole of a moving image;
a first recording step of recording information indicating the section or the whole of the moving image represented by the representative image in correspondence with the representative image;

a second recording step of recording information indicating a position of an image as a base of the representative image in correspondence with the said representative image;

a step of adding information indicating a purpose of use of the representative image as attribute information, the purpose of use indicating a function selected from functions applicable to the moving image;

a step of recording the attribute information added by said adding step in correspondence with the representative image; and a step of selecting only the representative image corresponding to the purpose of use based on the attribute information.

40. The moving image management method according to claim 39, wherein when the representative image is designated by the user, it is interpreted that the section or the whole of the moving image represented by the representative image is selected, and a function corresponding to the purpose is applied to the selected section or the whole of the moving image.

41. The moving image management method according to claim 40, wherein at said step of selecting only the representative image corresponding to the purpose based on the attribute information, a representative image having the attribute information corresponding to a browsing operation is selected, wherein said method has a display step of displaying the representative image, and wherein an application of a function corresponding to the purpose to the selected section or the whole of the moving image is a reproduction step of, when a desired representative image is designated from representative images displayed at said display step, reproducing a corresponding moving image based on section information added to the representative image.

42. The moving image management method according to claim 40, wherein in a print operation to print a desired frame in a desired moving image, at said step of selecting only the representative image corresponding to the purpose based on the attribute information, a representative image having the attribute information corresponding to the print operation is selected from representative images corresponding to the desired moving image, wherein said method has a display step of displaying the representative image having the attribute information corresponding to the print operation, and wherein an application of a function corresponding to a designated purpose to the selected section or the whole of the moving image when a desired representative image is designated from representative images displayed at said display step, is an output step for, when a desired representative image is designated from representative images displayed at said display step, referring to the information indicating a position of an image as a base of the representative image, and outputting a desired frame for print output.

43. The moving image management method according to claim 39, further comprising:

a step of classifying only the representative image for each purpose based on the attribute information.

44. The moving image management method according to claim 43, wherein when the representative image is designated by the user, it is interpreted that the section or the whole of the moving image represented by the representative image is selected, and a function corresponding to the purpose is applied to the selected section or the whole of the moving image.

45. The moving image management method according to claim 39, wherein when the information indicating the section or the whole of the moving image represented by the representative image and the attribute information are recorded on the storage medium, they are recorded, by representative image, in a particular continuous portion.

46. The moving image management method according to claim 45, wherein when the information indicating a position of an image as a base of the representative image and the representative image are recorded on the storage medium, they are recorded, by representative image, in a particular portion.

47. The moving image management method according to claim 46, wherein the particular portion is a continuous area on the storage medium.

48. The moving image management method according to claim 46, wherein only significant information of the information indicating a position of an image as a base of the representative image and the representative image is recorded in a portion for easy storage and access.

49. The moving image management method according to claim 39, wherein at said step of recording information indicating a purpose of the representative image as attribute information, the attribute information is an identification number previously defined for a purpose.

50. The moving image management method according to claim 42, wherein if an editing range is designated in a desired moving image, at said step of selecting only the representative image corresponding to the purpose based on the attribute information, a representative image having the attribute information corresponding to an editing operation and within the editing range is selected, and wherein said method has a display step of displaying the representative image within the editing range.

* * * * *

UNITED STATES PATENT AND TRADEMARK OFFICE
CERTIFICATE OF CORRECTION

PATENT NO. : 7,123,264 B2
APPLICATION NO. : 10/694575
DATED : October 17, 2006
INVENTOR(S) : Hiroshi Tojo et al.

It is certified that error appears in the above-identified patent and that said Letters Patent is hereby corrected as shown below:

ON THE TITLE PAGE:
At Item (56), References Cited, Other Publications, page 2, "PCT Internati nal Preliminary Examinati n Report" should read --PCT International Preliminary Examination Report--.

IN THE DRAWINGS:
Sheet No. 4, Figure 4, "MANEGEMENT" should read --MANAGEMENT--, and "INFOMATION" should read --INFORMATION--.
Sheet No. 6, Figure 6, "Imege" should read --Image--.

COLUMN 1:
Line 54, "for e.g." should read --for, e.g.,--.
Line 64, "miss." should read --misses.--.

COLUMN 6:
Line 35, "of e.g." should read --of, e.g.,--.

COLUMN 7:
Line 45, "an" should read --a--.

COLUMN 9:
Line 57, "has" should read --have--.

COLUMN 10:
Line 26, "a moving" should read --moving--.
Line 30, "area" should read --are--.
Line 33, "necessity" should read --necessity and--.

COLUMN 12:
Line 7, "thumbnail" should read --thumbnails--.
Line 38, "these" should read --this--.

COLUMN 13:
Line 2, "realize" should read --realizes--.

COLUMN 17:
Line 18, "the said" should read --the--.

UNITED STATES PATENT AND TRADEMARK OFFICE
CERTIFICATE OF CORRECTION

PATENT NO. : 7,123,264 B2
APPLICATION NO. : 10/694575
DATED : October 17, 2006
INVENTOR(S) : Hiroshi Tojo et al.

It is certified that error appears in the above-identified patent and that said Letters Patent is hereby corrected as shown below:

COLUMN 19:
Line 3, "the said" should read --the--.

COLUMN 20:
Line 33, "claim 46 ," should read --claim 46,--.
Line 43, "claim 42" should read --claim 39--.

Signed and Sealed this

Thirtieth Day of October, 2007

JON W. DUDAS
*Director of the United States Patent and Trademark Office*